US007363209B2

United States Patent
Kuschel et al.

(10) Patent No.: US 7,363,209 B2
(45) Date of Patent: Apr. 22, 2008

(54) SYSTEM AND METHOD FOR CONTROLLING JOBS OF A PRODUCTION DEVICE

(75) Inventors: Sebastian Kuschel, Dresden (DE); Gerd Limmer, Rückersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 254 days.

(21) Appl. No.: 10/544,973

(22) PCT Filed: Jan. 29, 2004

(86) PCT No.: PCT/EP2004/000810

§ 371 (c)(1),
(2), (4) Date: Aug. 9, 2005

(87) PCT Pub. No.: WO2004/070498

PCT Pub. Date: Aug. 19, 2004

(65) Prior Publication Data

US 2006/0190115 A1 Aug. 24, 2006

(30) Foreign Application Priority Data

Feb. 10, 2003 (DE) ................................ 103 05 344

(51) Int. Cl.
*G06F 9/44* (2006.01)
*G05B 19/04* (2006.01)
*G06F 19/00* (2006.01)

(52) U.S. Cl. .......................... 703/20; 358/296; 700/19; 700/100

(58) Field of Classification Search ................. 703/2, 703/22, 25, 20; 358/296, 1.15; 700/100, 700/19
See application file for complete search history.

(56) References Cited

U.S. PATENT DOCUMENTS 5,646,740 A * 7/1997 Webster et al. ............. 358/296
5,671,338 A * 9/1997 Araki et al. ................. 706/46
5,710,635 A * 1/1998 Webster et al. ............. 358/296

FOREIGN PATENT DOCUMENTS

WO WO 00/38091 6/2000

* cited by examiner

*Primary Examiner*—Thai Phan

(57) ABSTRACT

The invention relates to a system and a method for controlling jobs of a production device. The aim of the invention is to allow a current situation to be analyzed and the required operations to be planned, executed, and monitored irrespective of mathematical routines for optimizing the throughput. Said aim is achieved by the fact that a simulated image is formed starting from an initial situation based on real resources and real jobs, a potential sequence of jobs is optimized based on the initial situation regarding available resources and available jobs with the aid of an optimization algorithm, and the production device is controlled with the aid of a solution algorithm such that a target state is determined by simulating the required operations of the production device.

13 Claims, 2 Drawing Sheets

SYSTEM AND METHOD FOR CONTROLLING JOBS OF A PRODUCTION DEVICE

CROSS REFERENCE TO RELATED APPLICATIONS

This application is the US National Stage of International Application No. PCT/EP2004/000810, filed Jan. 29, 2004 and claims the benefit thereof. The International Application claims the benefits of German application No. 10305344.1, filed Feb. 10, 2003, both applications are incorporated by reference herein in their entirety.

FIELD OF INVENTION

The invention relates to a system and also a method for controlling jobs of a production device.

BACKGROUND OF THE INVENTION

A system of this type is employed in the field of automation technology, for example, in order to achieve the most optimum throughput possible for a production device or an entire production system consisting of a plurality of production devices. In this respect, the problem frequently arises of managing a plurality of jobs, which are also called tasks in the following, in the production device or production system in such a way that the available resources, i.e. the available individual modules of the production device or production system, are utilized in the most efficient manner possible and at the same time the shortest possible running time of the jobs and tasks can be obtained. This problem of optimum utilization is also referred to as "job-shop scheduling".

A device and a method for generating adaptive workflows are known from WO 00/38091. In this respect, individual job sequences are adapted dynamically to a changing work environment with the aid of a schedule planner and assigned work procedure instructions. If a control device identifies divergences in this respect, then the work procedures of uncompleted jobs can be re-assembled. Monitoring means are provided in this respect, which contain a virtual image of the physical environment.

SUMMARY OF THE INVENTION

The object underlying the invention is to specify a system and also a method which enables the analysis of the current situation, the planning of the necessary operations, and also the implementation and monitoring of same, in particular also independently of mathematical routines for optimizing the throughput.

This object is achieved by means of a system for controlling jobs of a production device, with a data processing device, which displays planning means for determining a possible optimum sequence of the jobs on the basis of an initial situation with regard to existing resources and existing jobs with the aid of an optimization algorithm, and procedure control means for coordinating the control of the production device with the aid of a solution algorithm, which is provided for ascertaining a target state by simulating the necessary operations of the production device.

This object is further achieved by means of a method for controlling jobs of a production device, where a simulated image is formed starting from an initial situation based on real resources and real jobs, where a possible optimum sequence of the jobs is formed on the basis of the initial situation with regard to existing resources and existing jobs with the aid of an optimization algorithm, and where the production device is controlled with the aid of a solution algorithm in such a way that a target state is ascertained by simulating the necessary operations of the production device.

Underlying the invention is the finding that production devices or production systems are frequently also subjected to major changes in a relatively short period. For this reason, a simulated image of the real circumstances is generated in the present method starting in the first instance from the initial situation, which is based on the real resources and the real jobs. On the basis of this initial situation, a possible optimum sequence of the jobs is formed with the aid of an optimization algorithm in the following stage.

The order of the jobs ascertained in this way, in the form of sequences, is then verified by means of the solution algorithm, which attempts to achieve a predefinable target state by simulating the necessary operations of the production device. The resultant modularity of the solution gives rise to a generic solution to scheduling jobs which can also be adapted in a simple manner to changes in the production device or production system. An essential aspect in this respect is that the method for analyzing the current situation, and for planning the necessary operations, and also the implementation and monitoring of simulated and also actually executed operations are modular in structure, where the mathematical routines for optimizing the throughput are independent of them. Overall, this therefore gives rise to a separation from a concrete problem of optimizing a singular production device, right through to a general method for handling scheduling tasks for a production device, which may be used both in the local control area for plants and also in factory-wide use for coordinating and safeguarding a manufacturing setup.

A simulated image of a real situation can be generated in a simple manner by the fact that the system displays initial means for generating an image of the initial state of the production device with regard to existing resources and existing jobs.

Advantageous usage scenarios of the system consist in the fact that the production device comprises a manufacturing machine, a production machine, a manufacturing plant and/or a production plant.

A further improvement in the job control is obtained by the fact that the solution algorithm is provided for verifying the possible optimum sequence of the jobs determined by the planning means.

An efficient processing of jobs which are already waiting is obtained by the fact that the planning means is provided for coordinating the starting of waiting jobs on the basis of the current situation image, and in particular with the aid of the optimization algorithm.

A further optimization of the planning tasks and the time-related control of the job sequences can be effected by the fact that the stage where a possible optimum sequence of the jobs is formed on the basis of the initial situation with regard to existing resources and existing jobs with the aid of the optimization algorithm is carried out multiple times.

Desired target states which can be predefined automatically or by the user with regard to the production device can be taken into account by the fact that the solution algorithm attempts, on the basis of a given simulated situation, to achieve a predefinable target state of the production device by simulating the necessary operations/stages.

A clear and target-oriented representation of results can be ensured by the fact that forward-planning operations and responses are determined in advance through the compilation of an action list which contains all the actions up to the final evacuation of the plant.

Defective situations can be identified in a simple manner by the fact that the situation is evaluated continuously and new actions are created for the elimination/bypassing of problems.

In the following, the invention is described in detail and explained on the basis of the exemplary embodiments represented in the figures.

DETAILED DESCRIPTION OF INVENTION

Figure 1:
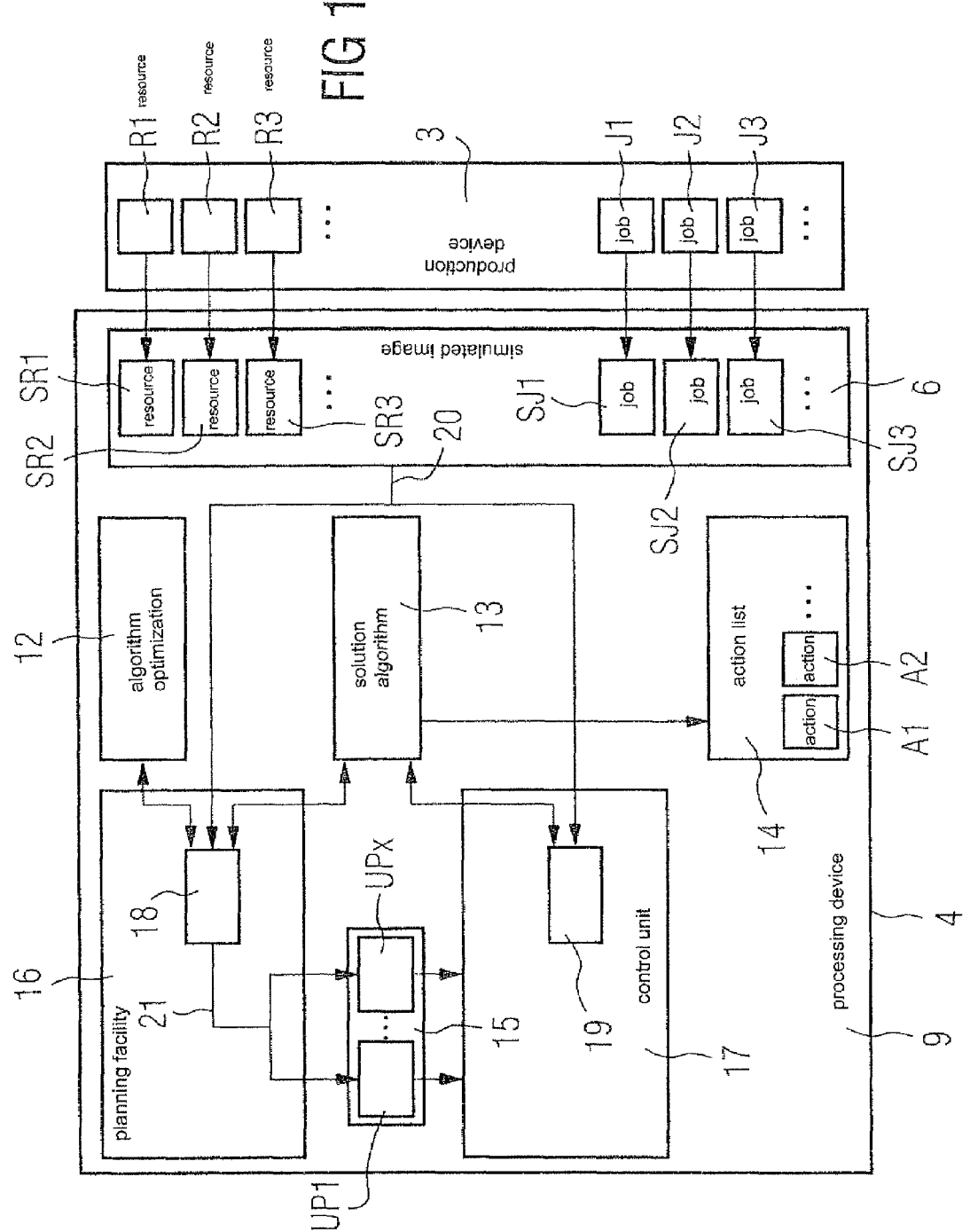
FIG. 1 shows a schematic representation of a system for controlling jobs of a production device with an outline diagram of the planning and control tasks.

FIG. 1 shows a schematic representation of a system 9 for controlling jobs of a production device 3. In the case of the exemplary embodiment shown in FIG. 1, the production device 3 is characterized by resources R1 . . . R3 and also currently existing jobs J1 . . . J3. The system 9 for controlling jobs of the production device 3 further includes a data processing device 4, which forms a simulated image 6 of the real production device 3. For this purpose, the simulated image 6 of the production device 3 includes simulated resources SR1 . . . SR3 and also simulated jobs or simulated tasks SJ1, SJ2, SJ3. The schematic outline of the job control, which exists on the data processing device 4, further includes a planning facility 16 and also a procedure control unit 17, where the planning facility 16 is also referred to as the scheduler 16 in the following and the procedure control unit 17 also as the dispatcher 17 in the following. The planning facility 16 coordinates the starting of the waiting jobs SJ1 . . . SJ3 or J1 . . . J3 on the basis of a current situation 18 with the aid of an optimization algorithm 12. The procedure control unit 17 coordinates the necessary actions for secure control of the plant 3. For this purpose, it utilizes a solution algorithm 13, which creates an action list 14 from the result, which is jointly managed by the procedure control unit 17. The action list 14 contains a list of actions to be implemented A1, A2, etc. for the processing and coordination of the jobs J1 . . . J3.

The basic functioning of the job control for the system represented in FIG. 1 is explained in detail in the following:

starting from the current situation of the real production device 3, consisting of the real resources Rx and the real jobs Jx, a simulated image 6 is created, characterized by the simulated resources SRx and the simulated jobs SJx, which provides the necessary information in the form of the current situation 20 for the job control. In this respect, the units existing on the data processing device 4, specifically the planning facility 16 and the procedure control unit 17, comprise two independently operating units, where the planning facility 16 is responsible for the scheduling of new jobs, i.e. for their starting time and their starting sequence. The procedure control unit 17 takes over the processing, the distribution and also the forwarding of the jobs. Both units, the planning facility 16 and also the procedure control unit 17 require respectively current situation images 18, 19 as necessary, which are derived from the simulated situation 20 as the image of the real situation.

The planning facility 16 utilizes the current situation 18 firstly for the purposes of determining a possible optimum job sequence, in line with the optimization algorithm 12. This sequence is handed over to the solution algorithm 13 together with the current situation 18, in order that the plausibility of the proposed solution can be checked. In line with the optimization algorithm 12, the stage for determining a job sequence or the plausibility of the ascertained sequence can be effected multiple times. The respectively determined optimum result is forwarded by the planning unit 16 to the procedure control unit 17 via an handover unit 15 with handover positions ÜP1, ÜPx to the procedure control unit 17. The procedure control unit 17 similarly requests the current situation 19 of the production device 3 or the plant as necessary, and calculates a list of the actions to be implemented A1, A2, etc. on the basis of the solution algorithm 13. However, this list does not just consist of precisely those necessary actions but similarly contains the future stages. The solution algorithm 13 therefore calculates all the actions A1 . . . An for a predefinable target state on the basis of its simulation rules, for example up to the complete "evacuation" of the production facility 3, which involves a semiconductor production device for example. Due to the modular structure, with planning means 16 and procedure control unit 17, and also optimization algorithm 12 and solution algorithm 13, the solution algorithm 13 is the only part of the system which must be adapted in a concrete manner to the respective production environment or the respective plant.

To the extent that the solution algorithm 13 identifies the fact that a situation is arising in the simulation and in the creation of the action list 14 which can no longer be solved, the point at which problems will occur in the plant or in the production device can already be determined in advance by the solution algorithm 13 in this case. A user can therefore already take counter-measures beforehand and therefore prevent malfunctions of the plant which would otherwise arise.

The actions A1 . . . Ax on the action list 14 contain the responses which must be triggered by a control unit of the production device or plant in order that correct processing of the jobs J1 . . . J3 is ensured. These actions A1 . . . Ax are created with a start time and the corresponding dependencies on the basis of the simulation rules of the solution algorithm 13 as necessary, when called by using the procedure control unit 17. The actions A1 . . . Ax are started at the computing time where they check their dependencies. Such a check on the dependencies, for example in the case of a semiconductor production device, means that a so-called handler existing there can only carry out placement in a specific module if a cover existing on the module, for example, has been opened previously. The actual action is only triggered if the check on all dependencies has been successful. Overall, a highly modular solution is therefore created in which large parts of the application can be utilized again and again for all possible usage scenarios in so-called job scheduling, in particular in the case of the consistent use of object-oriented development paradigms. Only the respective plant-specific details such as the individual actions (handler actions, module actions, etc.), the simulation environments for the resources, and the solution algorithm have to be formulated in a concrete manner for the respective use.

Figure 2:
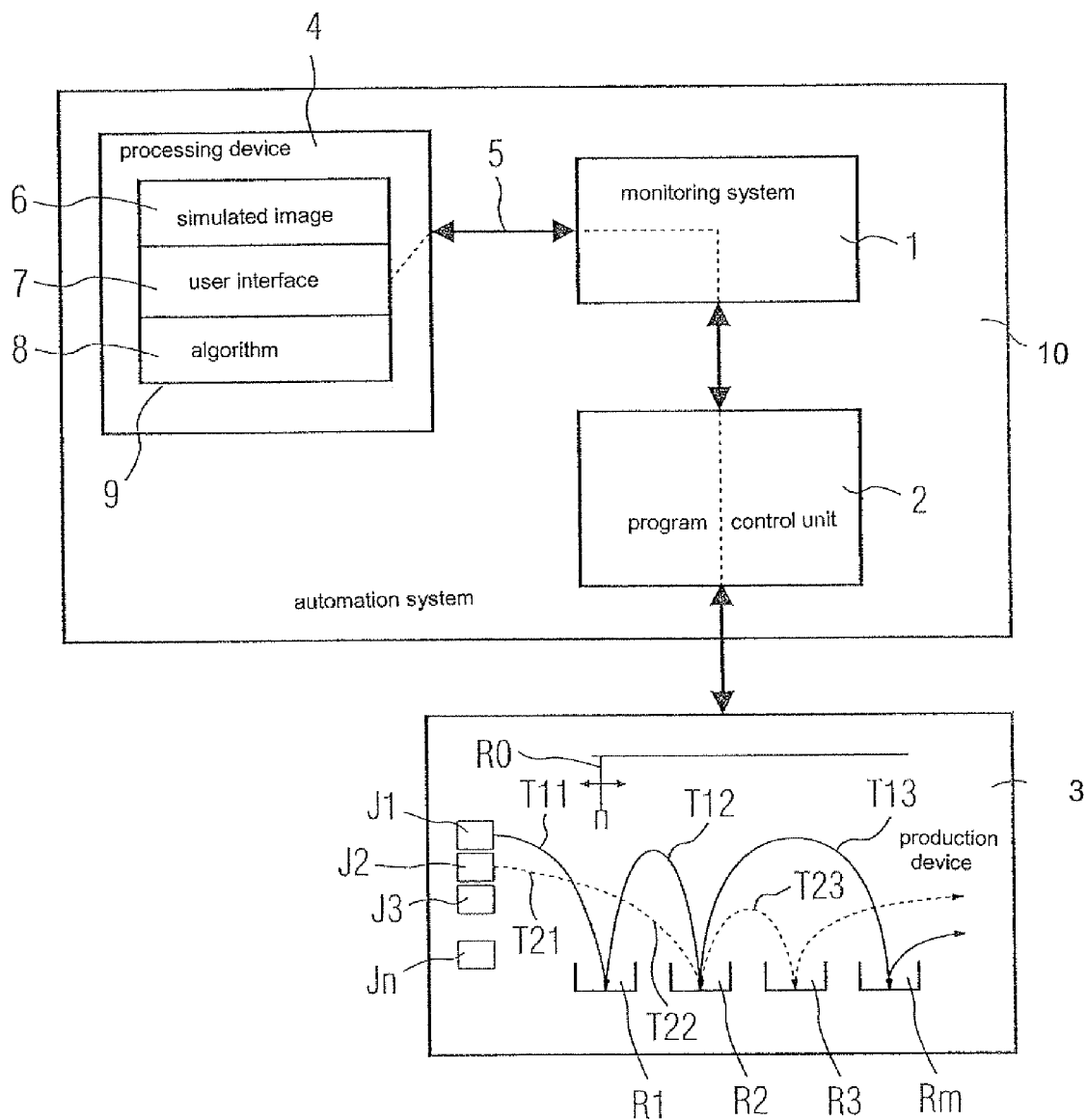
FIG. 2 shows a schematic representation of a system for controlling jobs with a link to an operating and monitoring system of a stored-program control unit.

FIG. 2 shows a schematic representation of a system for controlling jobs of a production device 3 which is connected to an automation system 10. The automation system 10 includes a stored program control unit 2, an operating and monitoring system 1, and also a data processing device 4 on which a job control program 9 can be executed. The job control program 9 includes a simulated image 6 of the real production device 3, an algorithm 8, and also a user interface 7. The user interface 7 is connected via a data link 5, for example an OPC (Open Process Control), to the operating and monitoring system 1 and via said operating and monitoring system to the stored program control unit 2, and via said stored program control unit in turn to the production device 3. The production device involves in particular a semiconductor production device, for example a so-called wetbench. The production device 3 is characterized by waiting jobs J1 . . . Jn, and also existing modules (resources) R1 . . . Rn, and also by a manipulation device R0 as a further resource.

With regard to the functioning of the job control program 9 on the data processing device 4, reference is made to the description relating to FIG. 1. As the starting point for the job control for the production device 3, for example a wetbench from the domain of the semiconductor industry, the individual jobs J1 . . . Jn should be guided and managed in such a way that an optimum throughput of the production device 3 can be achieved. In this respect, the jobs J1 . . . Jn should be managed and controlled in the production device 3 in such a way that the individual resources R0 . . . Rn can be utilized in the most efficient manner possible and at the same time the shortest possible running time of the jobs J1 . . . Jn can be expected. In this respect, the individual jobs J1 . . . Jn can consist of various part stages, so-called tasks T1 . . . T13, T21 . . . T23, where each stage is effected by means of an implementing operation of resource R1 . . . Rn. In line with the schematic representation of the production device 3 in FIG. 2, the jobs J1 . . . Jn can therefore possess a different number of stages and sequences. This problem of optimum utilization is solved with the aid of the job-shop scheduling program 9 which can be executed on the data processing device 4 together with the approach explained in connection with FIG. 1.

To summarize, the following advantages can be asserted for the proposed method:

Separation of the general scheduling problem from concrete optimization methods; consequently, a simpler exchange of the mathematical parts can be effected, which in turn allows a component-oriented plant configuration and modification.

Due to the independence of dispatcher and scheduler, local calculation of the individual parts can be effected. Distributed computer architectures can therefore be used, or the optimum scheduling of the waiting jobs can be effected without restrictions by the dispatcher. Previous plants only possess a limited "computing window" since the results from the scheduler also flow directly into the dispatcher.

Forward-planning operations and responses can already be determined in advance through the compilation of an action list which contains all the actions up to the final evacuation of the plant.

Defective situations are identified by the fact that the situation is evaluated continuously and new actions are created for the elimination/bypassing of bottlenecks/problems. Similarly, situations which cannot be solved are already identifiable in advance with the result that a certain advance warning time exists for the operator of the plant.

The use of object-oriented development paradigms makes it possible to achieve simple modularization, scaling and modification in a short period, since the main components remain unaffected.

The consistent separation of general algorithm and machine-specific simulations makes it possible to effect simple exchangeability, which can also be adapted dynamically to the running time in a complex system as necessary.

Starting from the problem, a consistent abstraction was necessary in order to structure the method in a generally valid manner. Results of independent components (scheduler, dispatcher, actions) can therefore now be used for the purposes of solving the overall problem. The solution is no longer based mainly on a purely mathematical description; instead, a general solution to the job-shop scheduling problem is obtained with the aid of simulation techniques. Mathematical components only continue to play a role in the case of the pure optimization, and can be exchanged without difficulty.

Moreover, it is not only current problems which are disclosed; instead, the use of the simulation up to the final "evacuation"/target state also identifies future sources of malfunctions.

To summarize, the invention therefore relates to a system 9 and also a method for controlling jobs J1 . . . Jn of a production device 3. To enable an analysis of a current situation, the planning of the necessary operations, and also their implementation and monitoring independently of mathematical routines for optimizing the throughput, a simulated image SR1 . . . SR3, SJ1 . . . SJ3 is formed starting from an initial situation 6 based on real resources R1 . . . R3 and real jobs J1 . . . J3, a possible sequence 15 of the jobs J1 . . . Jn is optimized on the basis of the initial situation 6 with regard to existing resources R1 . . . Rn and existing jobs J1 . . . Jn with the aid of an optimization algorithm 12, and the production device 3 is controlled with the aid of a solution algorithm 13 in such a way that a target state 14 is ascertained by simulating the necessary operations of the production device 3.

The invention claimed is:

1. A system for controlling jobs of a production device having resources and jobs, comprising a data processing device, wherein the data processing device comprises:

a simulated image of the production device, the simulated image including simulated resources of the production device resources and simulated jobs of the production device jobs;

a planning facility for determining a possible optimum sequence of the jobs of the production device based on an initial situation with regard to simulated resources and simulated jobs with the aid of an optimization algorithm; and a procedure control unit for coordinating the control of the production device with the aid of a solution algorithm, which is provided for ascertaining a target state by simulating the necessary operations of the production device.

2. The system according to claim 1, wherein the production device is a manufacturing machine, a production machine, a manufacturing plant, and/or a production plant.

3. The system according to claim 2, wherein the solution algorithm is provided for verifying the possible optimum sequence of the jobs determined by the planning facility.

4. The system according to claim 2, wherein the planning facility is provided for coordinating the starting of waiting jobs on the basis of the current situation image.

5. The system according to claim 1, wherein the solution algorithm is provided for verifying the possible optimum sequence of the jobs determined by the planning facility.

6. The system according to claim 5, wherein the planning facility is provided for coordinating the starting of waiting jobs on the basis of the current situation image.

7. The system according to claim 1, wherein the planning facility is provided for coordinating the starting of waiting jobs on the basis of the current situation image.

8. The system according to claim 7, wherein the planning facility is provided for coordinating the starting of waiting jobs on the basis of the current situation image and with the aid of the optimization algorithm.

9. A method for controlling jobs of a production device, comprising:
   creating a simulated image including simulated jobs and simulated resources;
   creating a possible optimum sequence of jobs via an optimization algorithm, the possible optimum sequence of jobs based on the simulated resources and the simulated jobs via an optimization algorithm; and
   controlling the production device with the aid of a solution algorithm in such a way that a target state is ascertained by simulating the necessary operations of the production device.

10. The method according to claim 9, wherein a stage where a possible optimum sequence of the jobs is created on the basis of the initial situation with regard to existing resources and existing jobs with the aid of the optimization algorithm is carried out multiple times.

11. The method according to claim 9, wherein the solution algorithm attempts, on the basis of a given simulated situation, to achieve a predefinable target state of the production device by simulating the necessary operations/stages.

12. The method according to claim 9, wherein forward-planning operations and responses are determined in advance through the compilation of an action list which contains all the actions up to the final depletion of the production device.

13. The method according to claim 9, wherein defective situations are identified by continuously evaluating the situation images and new actions are created for eliminating or bypassing the defective situations.

\* \* \* \* \*